US007215458B2

(12) United States Patent
Richards et al.

(10) Patent No.: US 7,215,458 B2
(45) Date of Patent: May 8, 2007

(54) DEFLECTION MECHANISMS IN MICROMIRROR DEVICES

(75) Inventors: Peter Richards, San Francisco, CA (US); Satyadev Patel, Sunnyvale, CA (US); Andrew G. Huibers, Palo Alto, CA (US); Michel Combes, Santa Cruz, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/982,259

(22) Filed: Nov. 5, 2004

(65) Prior Publication Data

US 2005/0088721 A1 Apr. 28, 2005

Related U.S. Application Data

(63) Continuation-in-part of application No. 10/340,162, filed on Jan. 10, 2003, now Pat. No. 7,012,592, and a continuation-in-part of application No. 10/607,687, filed on Jun. 27, 2003.

(51) Int. Cl.
*G02B 26/00* (2006.01)

(52) U.S. Cl. ...................................... 359/291; 359/292

(58) Field of Classification Search ................ 359/290, 359/291, 292, 293, 223, 224, 238, 298
See application file for complete search history.

(56) References Cited

U.S. PATENT DOCUMENTS

| | | | | |
|---|---|---|---|---|
| 3,553,364 | A | 1/1971 | Lee | |
| 4,112,575 | A | 9/1978 | Fu et al. | |
| 4,145,803 | A | 3/1979 | Tasch, Jr. | |
| 4,164,751 | A | 8/1979 | Tasch, Jr. | |
| 4,229,732 | A | 10/1980 | Hartstein et al. | |
| 4,356,730 | A | 11/1982 | Cade | |
| 4,441,791 | A | 4/1984 | Hornbeck | |
| 4,468,663 | A | 8/1984 | Kalt | |
| 4,470,667 | A | 9/1984 | Okubo et al. | |
| 4,566,935 | A | 1/1986 | Hornbeck | |
| 4,571,603 | A | 2/1986 | Hornbeck et al. | |
| 4,596,992 | A | 6/1986 | Hornbeck | |
| 4,615,595 | A | 10/1986 | Hornbeck | |
| 4,638,309 | A | 1/1987 | Ott | |
| 4,662,746 | A | 5/1987 | Hornbeck | |
| 4,680,579 | A | 7/1987 | Ott | |
| 4,705,361 | A | 11/1987 | Frazier et al. | |
| 4,728,185 | A | 3/1988 | Thomas | |
| 4,888,616 | A | 12/1989 | Nanamura et al. | |
| 5,050,157 | A | 9/1991 | Miura et al. | |
| 6,046,840 | A * | 4/2000 | Huibers | 359/291 |
| 6,388,661 | B1 | 5/2002 | Richards | |
| 6,594,057 | B1 * | 7/2003 | Drake et al. | 359/224 |
| 6,937,382 | B2 * | 8/2005 | Shih | 359/291 |
| 6,962,419 | B2 * | 11/2005 | Huibers | 353/99 |
| 2003/0137501 | A1 | 7/2003 | Richards | |
| 2004/0196722 | A1 | 10/2004 | Richards | |
| 2004/0263430 | A1 | 12/2004 | Richards | |
| 2005/0157375 | A1 * | 7/2005 | Doan et al. | 359/291 |

* cited by examiner

*Primary Examiner*—Ricky Mack
*Assistant Examiner*—Tuyen Tra
(74) *Attorney, Agent, or Firm*—W. James Brady, III; Frederick J. Telecky, Jr.

(57) ABSTRACT

A method and apparatus for operating spatial light modulator have been disclosed herein. The spatial light modulator comprises an array of micromirror devices, each of which further comprises a reflective deflectable mirror plate attached to a deformable hinge, and an addressing electrode for addressing and deflecting the mirror plate.

78 Claims, 4 Drawing Sheets

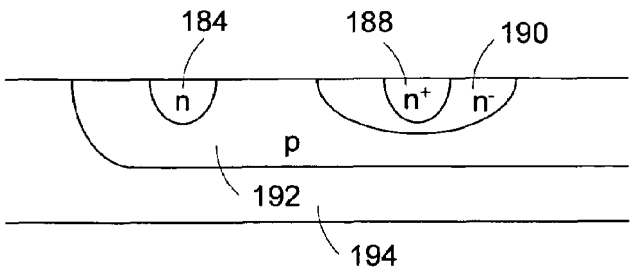
FIG. 4b
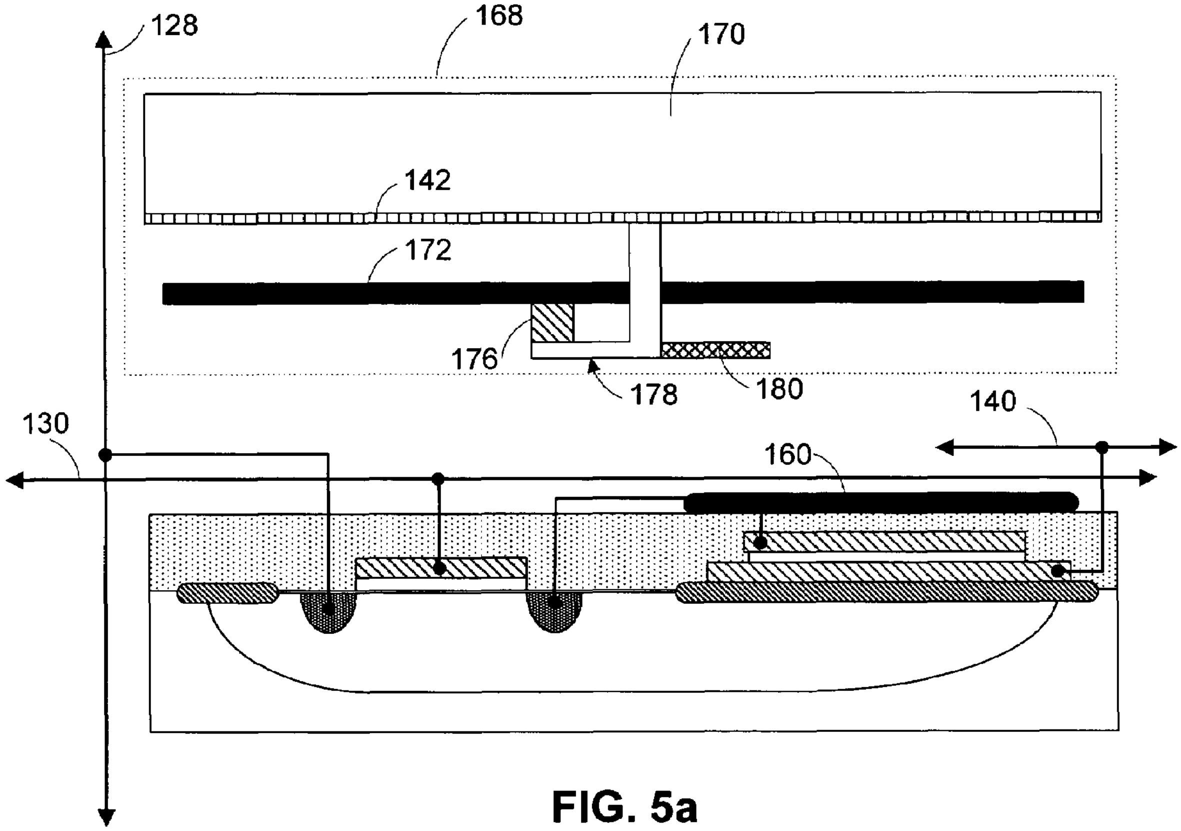
FIG. 5a
FIG. 5b
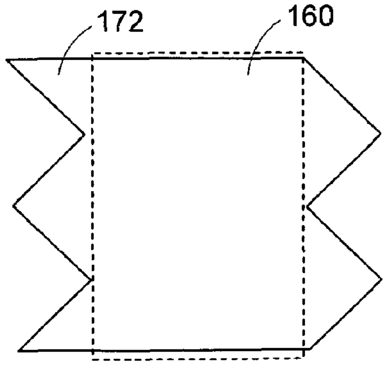

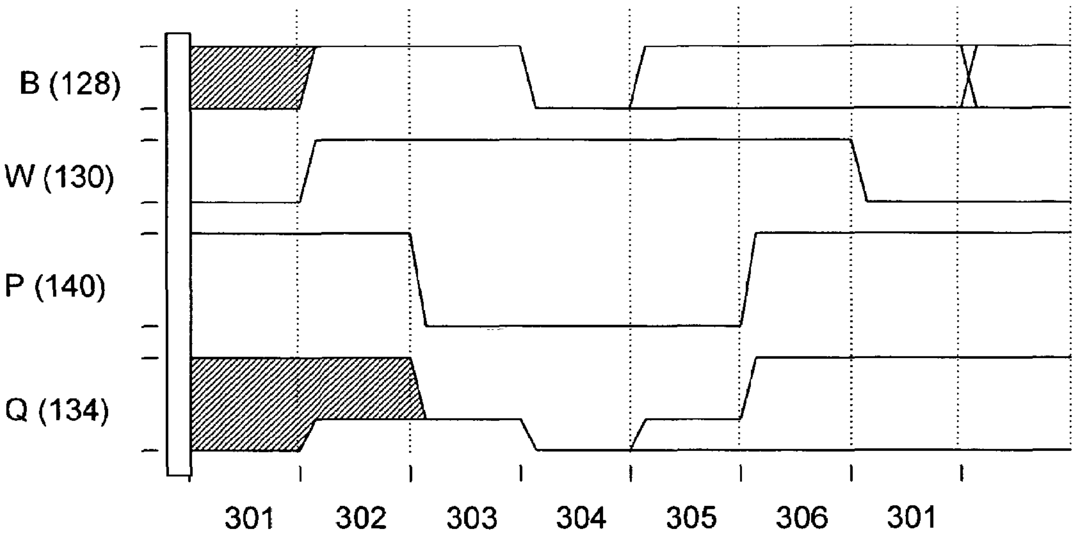
FIG. 6
FIG. 7a
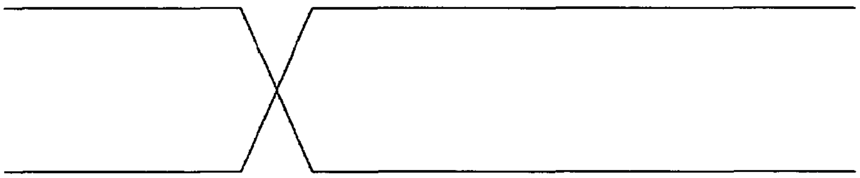
FIG. 7b
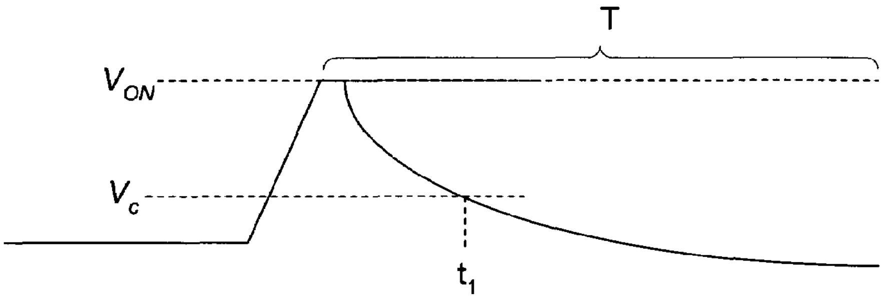
FIG. 7c
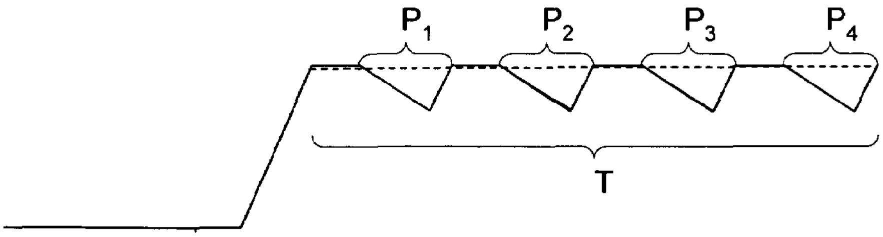

DEFLECTION MECHANISMS IN MICROMIRROR DEVICES

CROSS-REFERENCE TO RELATED APPLICATIONS

The present application is a continuation-in-part of U.S. patent applications Ser. No. 10/340,162 to Richards, filed Jan. 10, 2003 now U.S. Pat. No. 7,012,592; and Ser. No. 10/607,687 to Richards, filed Jun. 27, 2003, the subject matter of each being incorporated herein by reference.

TECHNICAL FIELD OF THE INVENTION

The present invention relates to the art of microstructures having deflectable elements, and more particularly to methods and apparatus for deflecting the deflectable elements of micromirrors.

BACKGROUND OF THE INVENTION

Microstructures with deflectable elements, such as micromirrors, have found many applications in basic signal transduction. For example, a micromirror-based spatial light modulator is a type of microstructure, and has been widely used in display systems, in which illumination light from light sources of the display system are steered into different spatial directions so as to generate desired illumination patterns (e.g. images or videos) in display targets or for direct view. A micromirror can also be a part of a communication device, such as optical switches.

Deflection of the deflectable elements in micromirrors can be accomplished through application of electrostatic forces derived from electrostatic fields that are established between the deflectable elements and associated addressing electrodes. In current micromirror devices, each micromirror is associated with an addressing electrode, and the addressing electrode is connected to a node of a circuit, such as a voltage output node of a memory cell. The memory cell stores a bit representing the voltage level to be applied to the addressing electrode. Such a voltage level on the addressing electrode, in turn determines the strength of the electrostatic field between the addressing electrode and the deflectable element of the micromirror when the voltage of the deflectable element is fixed.

Because the deflection of the deflectable element of a given micromirror is pre-dominantly determined by the application of the electrostatic fields that is further determined by the quality of the memory cells, a robust memory cell is certainly desired.

SUMMARY OF THE INVENTION

In view of the foregoing, the present invention provides a reliable and robust driving mechanism for deflecting the deflectable elements in micromirrors. The objects and advantages of the present invention will be obvious, and in part appear hereafter and are accomplished by the present invention. Such objects of the invention are achieved in the features of the independent claims attached hereto. Preferred embodiments are characterized in the dependent claims.

BRIEF DESCRIPTION OF DRAWINGS

While the appended claims set forth the features of the present invention with particularity, the invention, together with its objects and advantages, may be best understood from the following detailed description taken in conjunction with the accompanying drawings of which:

FIG. 4*b* demonstratively illustrates a portion of another exemplary memory cell in FIG. 3 according to yet another embodiment of the invention;

FIG. 5*a* demonstratively illustrates a cross-section view of an exemplary micromirror device, wherein the memory cell is connected to an addressing electrode and positioned proximate to a micromirror for deflecting the deflectable and reflective mirror plate of the micromirror;

FIG. 5*b* demonstratively illustrates a top view of an exemplary micromirror device having a mirror plate and an addressing electrode;

FIG. 6 illustrates different voltage levels in operating the memory cell; and FIGS. 7*a* through 7*c* demonstratively illustrate a method of operating the memory cell so as to compensate signal distortion arisen from charge leaking in the memory cell.

DETAILED DESCRIPTION OF EXEMPLARY EMBODIMENTS

The present invention discloses a deflection mechanism for deflecting the deflectable element in microstructures. As a particular example, a memory cell and a method of operating the memory cell are provided for deflecting the reflective and deflectable mirror plates of micromirrors.

In the following, the present invention will be discussed with reference to exemplary embodiments wherein Metal-Oxide-Semiconductor (MOS) type DRAM are fabricated and associated to micromirrors for deflecting the mirror plate. It will be appreciated by those skilled in the art that the following discussion is for demonstration purposes only, and should not be interpreted as a limitation. Instead, the present invention is applicable to other types of microstructures having elements that can be operated and deflected by electrostatic fields.

Figure 1:
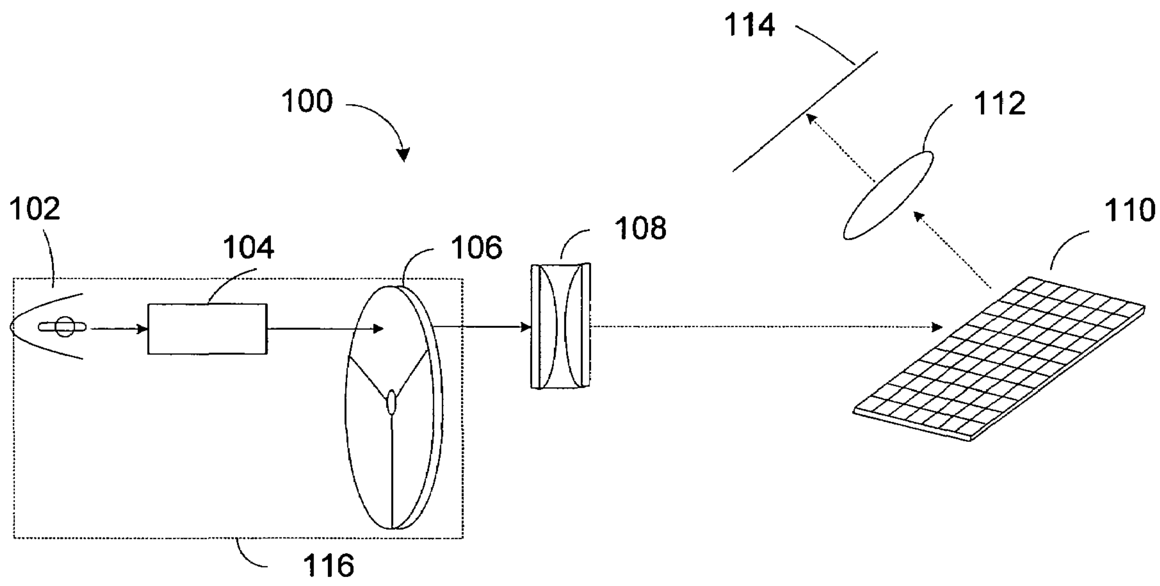
FIG. 1 illustrates an exemplary display system employing a spatial light modulator having an array of micromirror devices, in which embodiments of the current invention can be implemented.

Turning to the drawings, FIG. 1 illustrates a typical display system employing a spatial light modulator that comprises an array of micromirrors in which embodiments of the invention can be implemented. In its basic configuration, display system 100 comprises illumination system 116 for producing sequential colour light, light modulator 110, projection lens 112, and display target 114. Other optics, such as condensing lens 108 could also be installed if desired.

Illumination system 101 further comprises light source 102, which can be an arc lamp, lightpipe 104 that can be any suitable integrator of light or light beam shape changer, and color filter 106, which can be a color wheel. The filter in this particular example is positioned after light pipe 104 at the propagation path of the illumination light. In another example, the color filter can be positioned between the light source and light pipe 104, which is not shown in the figure.

Figure 2:
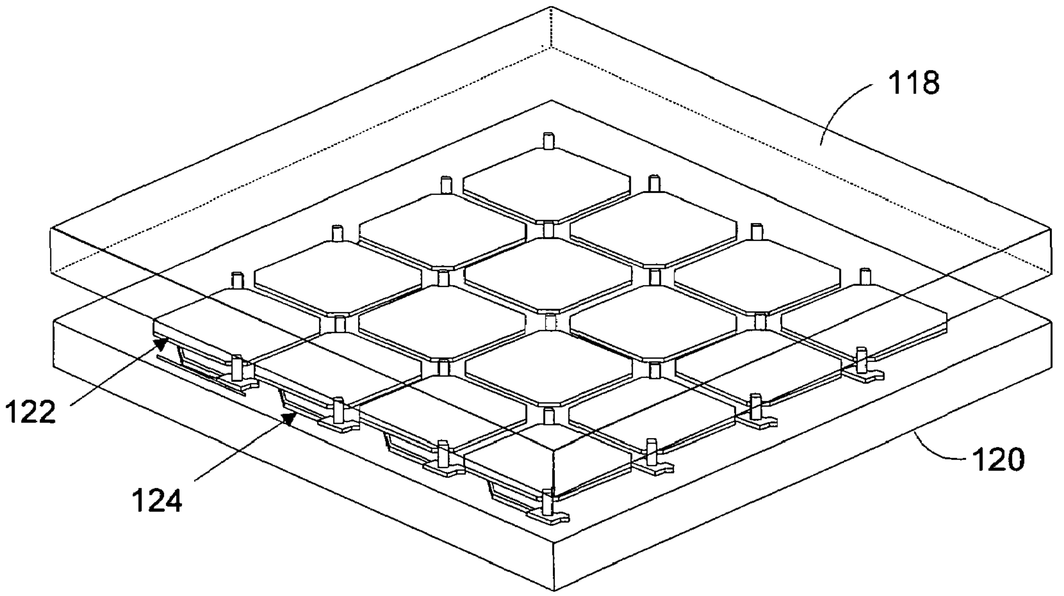
FIG. 2 is a perspective view of a portion of an exemplary spatial light modulator in FIG. 1.

FIG. 2 illustrates an exemplary spatial light modulator having an array of micromirrors that are individually addressable and deflectable. For demonstration and simplicity purposes, only 4×4 micromirrors are presented herein. In general, the micromirror array of the spatial light modulator may consist of thousands or millions of micromirrors, the total number of which determines the resolution of the displayed images. For example, the micromirror array of the spatial light modulator may have 640×480, 800×600, 1024×768, 1280×720, 1400×1050, 1600×1200, 1920×1080, or even larger number of micromirrors. In other applications such as optical switching, the micromirror array may have less number of micromirrors.

In this particular example, micromirror array 122 is formed on light transmissive substrate 118, such as glass or quartz. Addressing electrode and circuitry array 124 is formed on substrate 120 which can be a standard semiconductor on which standard integrated circuits can be fabricated. The addressing electrode and circuitry array is placed proximate to the micromirror array on substrate 118 for deflecting the micromirrors thereof.

Rather than forming the micromirror array and addressing electrode and circuitry array on separate substrates, they can be fabricated on the same substrate, such as a semiconductor substrate. There are still many other ways of fabricating a micromirror based spatial light modulator. For example, the micromirror substrate can be formed on a transfer substrate that is light transmissive. Specifically, the micromirror plate can be formed on the transfer substrate and then the micromirror substrate along with the transfer substrate is attached to another substrate such as a light transmissive substrate followed by removal of the transfer substrate and patterning of the micromirror substrate to form the micromirror.

The micromirrors of the micromirror array each have a deflectable and reflective mirror plate for reflecting illumination light into different directions. The deflection is accomplished through an electrostatic force derived from an electrostatic field established between the mirror plate and the addressing electrode associated with the mirror plate. The strength of the electrostatic field, thus the strength of the electrostatic force (torque) exerted on the mirror plate, is determined by the voltage stored in the circuitry, to a voltage node of which the addressing electrode is connected. An exemplary memory cell is demonstratively illustrated in FIG. 3, and is detailed in a co-pending U.S. patent application Ser. No. 10/340,162 to Richards, filed Jan. 10, 2003, the subject matter being incorporated herein by reference.

Figure 3:
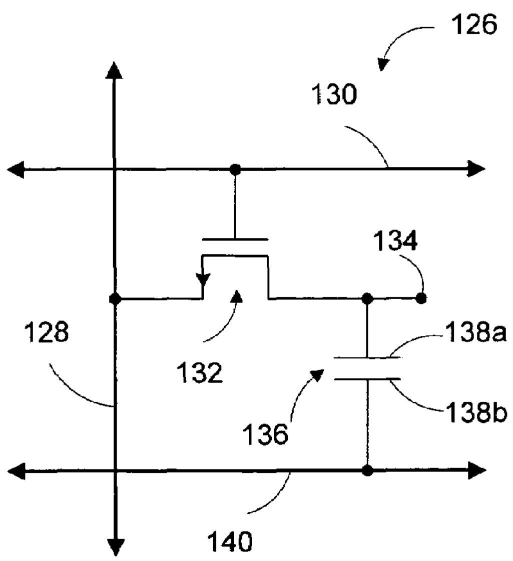
FIG. 3 schematically illustrates an exemplary memory cell that can be connected to an addressing electrode associated with a deflectable element for driving the deflectable element.

Referring to FIG. 3, memory cell comprises transistor 132 and capacitor 136 that has first plate 138*a* and second plate 138*b*. The source of the transistor is connected to bit line 128 from which a bit value can be written into the memory cell. The gate of the transistor is connected to wordline 130 through which the memory cell can be actuated (addressed) or de-actuated. The wordline can be the only wordline to which all memory cells in the row including memory cell 130 of the memory cell are connected. Alternatively, wordline 130 can be a part of a plurality of wordlines provided for the row including memory cell 130 of the memory cell array, as set forth in U.S. patent application Ser. No. 10/407,061 to Richards, filed Apr. 2, 2003, the subject matter being incorporated herein by reference.

The drain of transistor 132 is connected to the first plate 138*a* of capacitor 136, forming a voltage output node 134 to which the addressing electrode is connected. The voltage level of the voltage output node determines the voltage level of the addressing electrode. That is, the voltage, the strength of the electrostatic field, and the electrostatic force can be precisely controlled by the voltage stored in the memory cell.

Figure 4A:
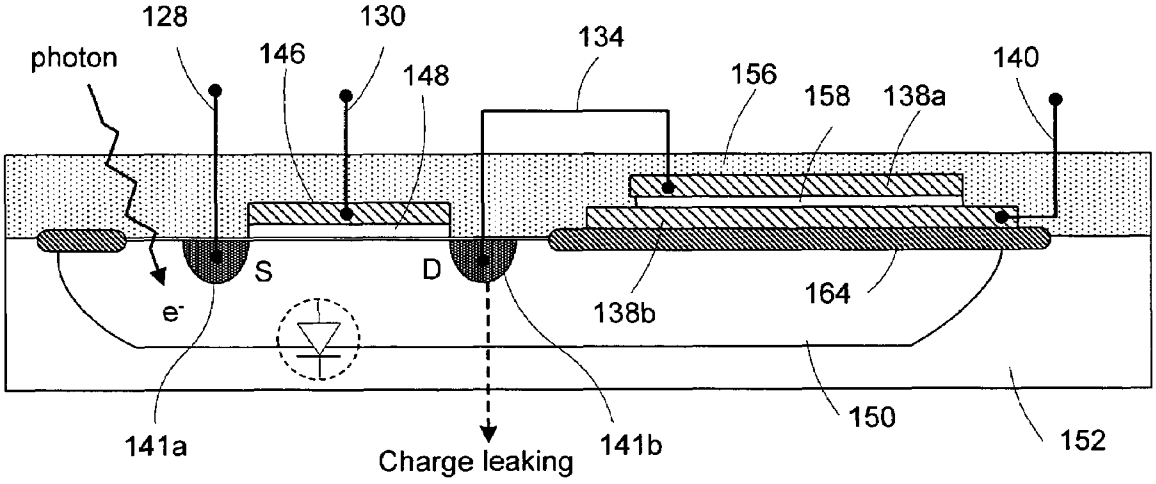
FIG. 4*a* demonstratively illustrates a cross-sectional view of the memory cell in FIG. 3 according to an embodiment of the invention.

It is generally advantageous to drive the micromirrors of a spatial light modulator with as large a voltage as possible. For example, a large actuation voltage increases the available electrostatic force available to move the micromirrors associated with pixel elements. Greater electrostatic forces provide more operating margin for the micromirrors-increasing yield. Moreover, the electrostatic forces actuate the micromirrors more reliably and robustly over variations in processing and environment. Greater electrostatic forces also allow the hinges of the micromirrors to be made correspondingly stiffer; stiffer hinges may be advantageous since the material films used to fabricate them may be made thicker and therefore less sensitive to process variability, improving yield. Stiffer hinges may also have larger restoration forces to overcome stiction. The pixel switching speed may also be improved by raising the drive voltage to the pixel, allowing higher frame rates, or greater color bit depth to be achieved. For this purposes, charge pumping line 140 is provided and connected to the second plate 138*b* of capacitor 136. With this configuration, the output voltage level at node 134 can be boosted significantly, as set forth in the co-pending U.S. patent application Ser. No. 10/340,162 to Richards, filed Jan. 10, 2003, which will not be discussed in detail herein. For better illustrating the memory cell in FIG. 3, a cross-section view of the memory cell as implemented in a typical 2-poly CMOS process is shown in FIG. 4*a*. Of course, the following is exemplary only and many other designs are possible.

Referring to FIG. 4*a*, metal interconnects and contacts to the source/drain diffusions and polysilicon gates are not shown for clarity. In this particular example, the memory cell is fabricated on an n-type silicon substrate 152, which can be obtained by properly doping a standard silicon substrate. p-type well 150 is formed in the n-type substrate by doping the n-type substrate so as to inverse the charge-polarity. The interface of the p-type well and the n-type substrate forms a p-n junction, which can be properly modeled as a diode, as shown in the figure. Gate oxide 148 and field oxide 164 are then formed. In this p-type well 150, $n^+$ (heavy doping) diffusions 141*a*, 141*b* are created to form the source and drain of the transistor (e.g. transistor 132 in FIG. 3). The diffusions 141*a* and 141*b* can be simple diffusions or any other source-drain structure well-known to those skilled in the art. For example, double-diffused-drain ("DDD") or lightly-doped drain ("LDD") type diffusions may be advantageous for high-voltage operation. Polysilicon is then deposited and patterned to form the transistor gate 146 on top of the thin gate oxide 148, and the second plate 138*b* of the storage capacitor 136. Subsequently the capacitor dielectric 158 is deposited and then the first plate (e.g. a polysilicon plate) 138*a* is deposited and patterned. Alternatively the second plate 138*b* may be formed first, and the gate 144 of the transistor and the first plate 138*a* may subsequently deposited and patterned.

Using metal interconnect and vias (not shown), the polysilicon gate 146 is connected to wordline 130. The source diffusion 141*a* is connected to the bitline signal 128. The drain diffusion 141*b* is preferably connected to the first plate 138*a* of capacitor 136. The "pump" signal 140 is connected to the second plate 138*b* of capacitor 136. Alternatively the drain diffusion 141*b* may be connected to the second plate 138*b* and the pump signal 140 to the first plate 138*a* of the capacitor. The connection of the transistor drain 141*b* and the first plate 138*a* forms the memory cell's charge-storage node 134 to which the addressing electrode can be connected.

In typical 2-poly processes, design rules often do not allow the top poly plate (the first plate of the capacitor) 138*a* to overlap the edge of the bottom poly plate (the second plate of the capacitor) 138*b*, often for step-coverage reasons. Since the "pump" signal 140 is common to a row of memory cells, it is preferable to connect the pump signal to the bottom poly (the second plate of the capacitor) and connect the pump signal 140 of neighboring memory cells by abutting the bottom poly (the second plate) 138*b*. The "pump" signal 140 could be connected to the top poly (the first plate of the capacitor) 138*a*, but in this case since top poly (the first plate of the capacitor) cannot cross over the bottom poly (the second plate of the capacitor) boundaries between neighboring cells, the available capacitor area would be reduced by gap required between the poly layers of neighboring cells. For this reason it is preferable to connect the pump signal to the bottom plate (the second plate of the capacitor) 138*b*.

In the above example, well 150 is formed and the source and drain of the transistor are formed in such the well. This fabrication scheme has many advantages. For example, undesired electrons induced through photon irradiation, or thermo-activation will diffuse across the depletion region between the p-type well 150 and the n-type substrate, reducing the likelihood that such induced charges will be collected by the source (or the drain) of the transistor, resulting in undesired charge leakage. This is of particular importance in display systems employing spatial light modulators wherein arc lamps (which are often operated in high temperature and emit intense light) are used as light sources of the display systems. The intense radiation of the arc lamp, as well as the thermo-radiation from the arc lamp can speed up the generation of the undesired charges (electrons $e^-$ or holes $e^+$) in the substrate 152 and the well 150. Without well 150, more of the induced charges will be collected by the storage node of the transistor, resulting in charge-leakage.

Rather than forming symmetrical source and drain in the transistor as shown in the figure, the source and drain of the transistor can be formed asymmetrically, an example of which is demonstratively illustrated in FIG. 4*b*. This configuration will have many benefits such as high-voltage outputs.

Referring to FIG. 4*b*, n-type substrate 194 is fabricated by doping a standard silicon substrate. p-type well 192 is formed on the n-type substrate. The interface of the p-type well and the n-type substrate forms a p-n-junction. Doping regions 184, 188, and 190 are then formed in the well 192. Doping zone 184 can be an $n^+$ (heavily doped). Doping region 190 ($n^-$) is preferably lightly doped. Within the doped region 190, doping region 188, which is preferably a heavily doped $n^+$ is formed. The doped regions 184 and 188 can thus be used as the source or drain of the transistor, though doped region 184 is more used as the source, and doped region 188 is used as the drain of the transistor, and connected to the capacitor forming a voltage output node to which the addressing electrode can be connected.

In the above examples discussed with reference to FIGS. 4*a* and 4*b*, the memory cells are n-MOS and are formed on n-type substrates, 152 and 192. Alternatively, the memory cells can be p-MOS and be formed p-type substrates. Specifically, a p-type substrate can be formed and an n-type well can be formed in the n-type substrate, followed by fabrication of p-type source and drain of the transistor by proper doping. The source and drain can be heavily doped or light doped according to user's specification. And the source and drain can be symmetric, such as similar to that in FIG. 4*a*, or asymmetric similar to that in FIG. 4*b*.

The fabricated memory cell is then associated with a micromirror for deflecting the deflectable and reflective mirror plate of the micromirror, as shown in FIG. 5*a*. Referring to FIG. 5*a*, a cross-section view of a micromirror device having a micromirror (e.g. micromirror 168) and an addressing electrode connected to a memory cell is demonstratively illustrated therein. In this example, micromirror 168 comprises substrate 170, which can be alight transmissive substrate, such as glass or quartz, and mirror plate 172 having a reflecting surface. The mirror plate is attached to a deformable hinge (not shown in the figure for clarity purposes), such as torsion hinge through hinge contact 176 such that the mirror plate can rotate relative to the substrate. The hinge is held by hinge support 178 on substrate 170. According to the invention, the micromirror device, specifically the mirror plate of the micromirror device has a dimension that is 20 microns or less, or 15 microns or less, or 10 microns or less. The area of the micromirror device, or the area of the mirror plate is 400 $um^2$ or less, or 225 $um^2$ or less, or 100 $um^2$ or less.

The mirror plate can be attached to the hinge in many ways. For example, the mirror plate can be attached to the hinge such that the mirror plate can rotate asymmetrically. This can be achieved by attaching the mirror plate to the hinge at an attachment that is not at the center of the mirror plate when viewed from the top of mirror plate at a non-deflected state. Or the mirror plate can be attached to the hinge such that the rotation axis of the mirror plate is parallel to but offset from a diagonal of the mirror plate when viewed from the top of the mirror plate at a non-deflected state. It is more preferred that the hinge and the mirror plate are in different planes (e.g. planes parallel to substrate 170) when the mirror plate is at a non-deflected state (e.g. parallel to the substrate). For reducing undesired light scattering and thus improving the contrast ratio, the hinge can be formed underneath the mirror plate in the direction of the incident light.

For improving the reliability and performance of the micromirrors, other features can be provided, such as stopper 180. Stopper 180 in this example is formed on hinge support 178 for defining the rotation angle of the mirror plate at the ON state. Other configurations for the stoppers are set forth in U.S. patent applications Ser. No. 10/437,776, filed May 13, 2003; Ser. No. 10/703,678, filed Nov. 7, 2003, the subject matter of each being incorporated herein by reference.

The mirror plate of the micromirror may have different shapes, one of which is illustrated in FIG. 5*b*. Referring to FIG. 5*b*, a top view of an exemplary mirror plate is illustrated therein. Mirror plate 172 has zigzagged edges for reducing undesired light scattering so as to improved the contrast ratio of the displayed images. Addressing electrode 160 is placed underneath the mirror plate for deflecting the mirror plate. According to the invention, the addressing electrode has an area that is generally 75% or more, or 80% or more, or 85% or more, or 95% or more of the area of the mirror plate.

For deflecting mirror plate 172, addressing electrode 160 is positioned proximate to the mirror plate. As an example, the distance between the mirror plate and the addressing electrode associated with the mirror plate can be from 3 to 9 microns, such as from 4 to 7 microns, or around 5.5 microns. The addressing electrode is connected to the voltage output node 134 formed by the drain of the transistor and the plate (the first plate) of the capacitor in connection to the drain. The addressing electrode is preferably positioned such that the electrostatic field applied for deflecting the micromirror is best utilized. That is, for the given electrostatic field, the electrostatic force on the mirror plate can be maximized. This can be achieved by placing the addressing electrode extending beyond the mirror plate in a direction towards the furthest point of the mirror plate to the hinge of the micromirror, as set forth in US provisional paten application "Micromirror with Offset Addressing electrode" filed Jun. 23, 2004, the subject matter being incorporated herein by reference.

In addition to addressing electrode 160 for rotating the mirror plate to the ON sate, conducting film 142 can be formed on a surface of the substrate so as to rotate the mirror plate to the OFF state, wherein the conducting film is preferably light transmissive. Specifically, a voltage can be applied to such conducting film, yielding a voltage difference between the mirror plate and such conducting film. If such voltage difference has a magnitude such that the addition of the torque of the electrostatic force derived from such voltage difference and the torque of the restoration force in the deformed hinge is larger than the torque of the electrostatic force derived from the voltage difference between the mirror plate and the ON state addressing electrode, the mirror plate is rotated to the OFF state. Alternatively, the conducting film can be formed as conducting strips, frames, or segments on the surface of the substrate, as set forth in U.S. patent application Ser. No. 10/437,776, filed May 13, 2003. For better coupling the addressing electrode to the mirror plate electrostatically, it is further preferred that the ratio of the addressing electrode to the mirror plate is 75% or more, or 85% or more, or 90% or more, or 95% or more.

By providing and driving the "pump" signal 140 in conjunction with the bitline 128 and wordline 130 as described in this invention, it is possible to store a large voltage on the storage node 134 (also the voltage on addressing electrode 160), such as a voltage larger than $V_{dd}-V_t$, wherein $V_{dd}$ is the maximum voltage allowed by the breakdown limits of the integrated circuitry process in which the circuit is fabricated, and $V_t$ is the transistor's threshold voltage. The ability of providing large voltage at the voltage output node allows for application of large voltage on the addressing electrode, and in turn allows for voltage control of the addressing electrode in a wide range.

For deflecting the mirror plate, an electrostatic force is applied to the mirror plate. Such electrostatic force can be derived from an electrostatic field established between the mirror plate and addressing electrode with the strength of the electrostatic force depending only on the voltage difference between the addressing electrode and mirror plate for a given micromirror device. For this reason, voltages for the mirror plate and addressing electrode can be applied in many different ways so long as the voltage difference therebetween is sufficient to deflect the mirror plate to desired angles (e.g. the ON and OFF state angles). As a way of example, the ON state angle of the ON state for the micromirror device is 8° degrees or more, such as 10° degrees or more, or 12 degrees or more, or 14°degrees or more, or 16° degrees or more. The OFF state angle can be parallel to the substrate on which the mirror plate is formed, or −2° degrees or less, or −4° degrees or less. The voltage difference between the mirror plate and the addressing electrode for the mirror plate at the ON state is preferably 28 volts or more, such as 30 volts or more, 35 volts or more or 40 volts or more. And such voltage difference can be maintained for a time period corresponding to one least-significant-bit or more defined based on a pulse-width-modulation algorithm for producing a desired image. The voltage difference between the mirror plate and the addressing electrode for the mirror plate at the OFF state can be 17 volts or less.

The above voltage difference can be achieved in many different ways by applying different voltages to the mirror plate and the addressing electrode associated with the mirror plate. As an aspect of the embodiment of the invention, the voltage applied to the addressing electrode changes when the mirror plate switches between the ON and OFF state. In particular, the voltage on the addressing electrode may change polarity, for example, from positive to negative and vice versa. Such voltage change whether changing polarity or not, can be 10 volts or more, or 15 volts or more, or 20 volts or more, and more preferably from 13 to 25 volts.

The time duration of the applied voltage to the addressing electrode and mirror plate, may depend upon the image data of desired images according to a PWM algorithm. As an example, the duration of the applied voltages on the addressing electrode and mirror plate, as well as the voltage differences between the mirror plate and the addressing electrode (or the voltage difference between the mirror plate and the conducting film on the substrate if applicable) is 10 microseconds or more, such as 100 microseconds or more, or 400 microseconds or more, or 600 microseconds or more, or from 100 to 700 microseconds.

According to one embodiment of the invention, the transistor (transistor 132 in FIG. 3) is an N-MOS transistor. Bitline 128 and wordline 130 take on logic levels of logic '0'=0V and logic '1'=$V_1$, where $V_1>0$. Pump signal 140 takes on logic levels of logic '0'and logic '1'=$V_{PH}$, where $V_{PH}>V_{PL}$. Exemplary voltage waveforms applicable to the memory cell, as well as the micromirror, are illustrated in FIG. 6.

Referring to FIG. 6, in the cell's 'hold' state 301, the cell stores a value as a high or low voltage on the storage node 134. The cell's control signals (collectively the wordline, bitline, and pump signal) are set as follows in the 'hold' state. The wordline 130 is held low, turning off the pass transistor 132 (in FIG. 3). The pump signal 140 is held in a high state. The bitline 128 may be in either a high or low state; the bitline state does not matter since the pass transistor 132 is off. In this state the bitlines and other rows' wordlines and pump signals may be driven as necessary to access other rows of cells while the illustrated row remains stable in its 'hold' state.

In order to prepare the cell to be written, the 'pump' signal voltage must be brought low. However, if the voltage on the storage node 134 is already low, care must be taken so that the storage node voltage 134 is not driven below the potential of the substrate 152 (usually GND) when the pump signal 140 falls. For example, suppose the stored voltage Vq on the storage node 134 is 0 and the wordline is maintained in the low state while the pump signal 140 is driven low. Since the pass transistor is off, coupling through the capacitor will drive the storage node 134 voltage down as the pump signal 140 falls—until the storage node 134 goes a diode-drop below ground, forward-biasing the PN junction between the device's drain 141*b* and the substrate 152. This is highly undesirable as it would inject minority carrier current into the substrate, likely causing problems with latchup, noise, and/or leakage in nearby circuits.

One approach to mitigating the substrate-current problem is to set the bitline 128 low and the wordline 130 high while the pump signal 140 is brought low, effectively connecting the storage node to ground through the turned-on 'switch' formed by the pass transistor. If the pass transistor 132 acted as an ideal switch this would then prevent the storage node 134 from being driven below ground. However, the finite on-resistance of the pass transistor, bitline, and bitline driver will still allow some excursion below GND as the pump signal falls. While the pass transistor drain junction may not be fully forward-biased in this case, the situation is still marginal and a more robust solution is desirable.

A preferred solution to the substrate-current problem is to drive the bitline and wordline high before the pump signal is brought low. This limits the minimum voltage excursion on the storage node 134 to be $V_{dd}-V_t$, well above ground and positively safe from any undesired substrate-injection effects. Thus, in preparation for a write cycle to the pixel cell, it is preferable that the bitline, wordline and pump signal are first set to a ‘pre-discharge’ state 302 in which the bitline, wordline, and pump signal are all high. If the pixel originally was storing a low voltage, its voltage is pulled up to $V_{dd}-V_t$. If the pixel was originally storing a high voltage, the stored voltage is unaffected.

Subsequently, in the ‘discharge’ state 303, the pump signal is set low. If the pixel originally stored a high voltage, the stored voltage is brought down to $V_{dd}-V_t$. If the pixel originally stored a low voltage, the stored voltage is clamped to $V_{dd}-V_t$, as the pump signal falls.

Due to second-order effects such as leakage and capacitive charge-sharing, the final voltage after the ‘discharge’ state may depend slightly on the original pixel state. To guarantee that the previous pixel state is fully cleared, the control signals may optionally be set to the ‘clear’ state 304 in which the bitline is set low, the wordline is high, and the pump signal is low, thereby forcing the stored voltage to zero volts.

After the ‘discharge’ state 303 and the optional ‘clear’ state 304, the cell is ready to be written with a new stored value. The control signals are set to the ‘write’ state 305 in which the bitline of the pixel is set high or low depending on the desired final pixel value, the wordline is high, and the pump signal is low. The stored pixel voltage will go to 0 or $V_{dd}-V_t$ depending on whether the bitline is low or high. Subsequently, the control signals are set to the ‘charge’ state 306 in which the pump signal is set high, and the bitline and wordlines retain their previous states from the ‘write’ state. If the bitline is low, the pass transistor will be on and the pixel’s stored voltage will be clamped at zero volts as the pump signal rises. However, if the bitline is high, the transistor will be off and the stored voltage will be driven above the bitline and wordline voltage by the rising edge of the pump signal coupling through the storage capacitor.

Finally, the wordline is brought low, returning the control signals to the ‘hold’ state 301 and completing the write cycle. The desired high or low voltage has been stored in the cell.

Ideally, in the ‘charge’ state, the pumpline’s upward step of $V_{ph}-V_{pl}$ volts would result in an upward step on the cell voltage of $V_{ph}-V_{pl}$ volts from the initial value of $V_{dd}-V_t$, for a final voltage of $V_{dd}-V_t+V_{ph}-V_{pl}$. For example, if $V_{pl}$ is 0 and $V_{ph}$ is the maximum rated voltage of the process, then the maximum final pixel voltage is approximately $V_{dd}-V_t+V_{max}$, which would be greater than the maximum allowed voltage. The chosen value for $V_{dd}$ and/or $V_{ph}-V_{pl}$ can be reduced as necessary to keep the maximum cell voltage within acceptable limits while providing substantial margin below the maximum rated supply voltages.

Non-ideal effects such as charge-sharing reduce the size of upward ‘step’ on the stored pixel voltage during the ‘charge’ state from $V_{ph}-V_{pl}$ to $K(V_{ph}-V_{pl})$, where K is slightly less than 1. By increasing $V_{dd}$ or $V_{ph}-V_{pl}$ slightly this effect may typically be overcome; in typical cases the required increase is still within the maximum rated supply voltages for $V_{ph}$ and $V_{pl}$.

An additional advantage of this invention is that the source node 141*a* and gate 146 of the pass transistor do not need to support the full output voltage swing. This enables an asymmetrical high-voltage transistor to be used where only the drain is HV-tolerant, resulting in a more compact layout. Also a thinner gate oxide can be used since the wordline voltage is low, improving the drive characteristics of the pass transistor. Additionally, the circuitry that drives the bitlines and wordlines is simplified due to the reduced voltage swing, high-voltage level shifters and drivers are only required on the pump signals. The reduced voltage swing on the bitlines also greatly reduces the power consumption of the device.

An equivalent circuit could equally well be implemented using a PMOS pass transistor in an n-type substrate or well, with the appropriate change in polarity of voltage levels the control signals as shown in Table 1.

TABLE 1

| Transistor type | Wordline ‘active’ | Wordline ‘inactive’ | Bitline ‘active’ | Bitline ‘inactive’ | Pumpline ‘active’ | Pumpline ‘inactive’ |
|---|---|---|---|---|---|---|
| NMOS | high | Low | High | Low | high | low |
| PMOS | low | High | Low | High | low | high |

A potential problem with this circuit exists due to the ‘field threshold’ of the bottom capacitor plate over the field oxide and substrate. When large voltages are applied to this bottom plate, the surface of the substrate may be inverted, producing an undesired parasitic FET. The minority carriers and depletion region associated with this parasitic FET may interact unfavorably with the cell’s pass transistor, and it is desired to avoid this effect.

A solution to this problem can be (in the case of an NMOS pass transistor in a p-substrate) to offset the levels of the pump signal. For example, $V_{pl}$=−10V and $V_{ph}$=+10V could be used equally well instead of $V_{pl}$=0V and $V_{ph}$=+20V. However, in the case of a conventional p-substrate, n-well process, the negative voltage of $V_{pl}$ presents practical difficulties, as NMOS device cannot be fabricated to drive the pump signal below ground.

A preferred alternative is to use a PMOS pass transistor, fabricated in an n-well biased to $V_{dd}$, where $V_{dd}$ is the maximum positive voltage on the bitline and wordline. In this case we can choose $V_{pl}$=0V and $V_{ph}$=+20V, driving the pump signal low with an NMOS device fabricated in the substrate and high with a PMOS device fabricated in an electrically separate n-well biased to $V_{ph}$.

This design will result in the stored pixel voltage being driven below ground—however this is acceptable as the voltage is only present on the p+diffusion of the pass transistor within an n-well.

An advantage of fabricating the pass transistor in a well with a bias voltage between $V_{ph}$ and $V_{pl}$ is that the pump voltage creates less-harmful accumulation in the substrate surface instead of inversion. In the case of a p-substrate process, this would require choosing a PMOS device and an n-well bias below the maximum pump signal voltage $V_{ph}$. One skilled in the art will appreciate that a similar but complementary circuit provides this advantage if substrate is n-type; then an NMOS device should be used in a p-well with bias voltage above the minimum pump signal voltage.

A further advantage of fabricating the pass transistors in a well (as opposed to the substrate) is that light-induced leakage current is reduced. While some incident photons from the projection system’s light source will create hole-electron pairs in the well, contributing to cell leakage, a significant fraction of the incident photons from the projection system’s light source will pass through the well and generate hole-electron pairs in the substrate, creating harmless leakage between the well and substrate.

An advantage of using a PMOS pass transistor is that, at high bias voltages, it exhibits reduced impact ionization compared to an NMOS transistor, which in an NMOS transistor can result in multiplication of the leakage current and increased leakage compared to a PMOS device.

A further advantage of this well-biasing scheme is that the maximum absolute value of the voltage across the storage capacitor is reduced, enabling a thinner oxide to be used for greater capacitance and more reliable operation.

A still further advantage of the circuit of the present invention is that the pass transistor of the circuit can function as an asymmetric high-voltage transistor. Specifically, the absolute value of the drain voltage can be greater than that of the source. Moreover, the absolute value of the difference between the maximum voltage and the minimum voltage of the drain can also be greater than that of the source.

A still further advantage of the circuit provided by the present invention is that the asymmetric high-voltage pass transistor allows more area for the capacitor. Moreover, the asymmetric high-voltage transistor enables the storage capacitor to maintain a high voltage. For example, the capacitor can maintain a voltage at least 10 volts, 15 volts or 20 volts.

A further advantage of the circuit provided by the present invention is that a standard logic voltage level of 5 volts or less (e.g. 3.3 or 5 volts) may be used on the bitline and wordline of a pixel cell. However, by providing a pump signal, a total pixel voltage swing of at least 5 volts may be obtained. Voltage swings of 10 volts or more (or even 20 volts or more) can be achieved in the present invention.

The circuit as discussed above has varieties of applications. For example, the circuit can be used in a spatial light modulator. In this application, the storage node (e.g. storage node 134 in FIG. 3) can be used to control optical states of a pixel in the spatial light modulator, wherein the pixel can be a liquid crystal pixel cell.

With the addressing electrode and the connected memory cell, the voltage between the mirror plate and the addressing electrode can be large, such as larger than $V_{dd}-V_t$. In other words, such memory cell allows for selecting the operation voltage applied between the mirror plate and the addressing electrode for rotating the mirror plate with in a large range than those in the art. In accordance with an embodiment of the invention, the operation voltage can be 25 Volts or less, or more preferably 20 volts or less, or more preferably 18 volts or less, such as from 5 to 18 volts, or from 10 to 15 volts. A low operation voltage has many benefits, such as cost-effective and simplified design and fabrication.

Due to fabrication limitations or other possible factors, electric leakage in the memory cell may occur even for a perfect design. As a consequence, desired voltage waveform may not be properly presented in the mirror plate of the micromirror, which will be discussed in detail with reference to FIGS. 7*a* to 7*c*.

FIG. 7*a* plots a desired voltage waveform on the memory cell, as well as on the addressing electrode and mirror plate. Due to the charge leakage in the memory cell, the desired voltage decays during time period T, as shown in FIG. 7*b*. When the ON state voltage $V_{ON}$ (e.g. corresponding to the ON state) drops under a critical value $V_c$ matter time $t_1$, the electrostatic field derived from the voltage will not be sufficient for maintaining the mirror plate at the ON state. As a result, the mirror plate may starts to depart from the ON state towards its natural resting state, such as the OFF state, resulting in improper light modulation pattern.

An approach to solve this problem is frequently refreshing the memory cell, as demonstratively illustrated in FIG. 7*c*. Referring to FIG. 7*c*, during time period T, the memory cell is frequently updated at time slots $P_1$ to $P_4$. During each time slot, the dropped voltage is refreshed by pulling the dropped voltage to the proper ON state voltage. The total number of such refreshments and the duration of each time slot can be determined based upon the charge leaking characters in the memory cell and the voltage threshold based on which the ON state and OFF state voltages of the micromirror are defined.

It will be appreciated by those of skill in the art that a new and useful method and apparatus for deflecting the deflectable elements in microstructures have been described herein. In view of the many possible embodiments to which the principles of this invention may be applied, however, it should be recognized that the embodiments described herein with respect to the drawing figures are meant to be illustrative only and should not be taken as limiting the scope of invention. Those of skill in the art will recognize that the illustrated embodiments can be modified in arrangement and detail without departing from the spirit of the invention. Therefore, the invention as described herein contemplates all such embodiments as may come within the scope of the following claims and equivalents thereof.

The invention claimed is:

1. A method for operating a micromirror device having a deflectable reflective mirror plate that is attached to a deformable hinge held on a substrate, and an addressing electrode that is positioned proximate to the mirror plate, the method comprising:

upon receiving an ON state signal, applying a first voltage to the mirror plate and a second voltage to the addressing electrode such that the mirror plate is rotated to an ON state angle of 12° degrees or more from a non-deflected state, wherein the difference between said two voltages is 30 volts or more.

2. The method of claim 1, wherein the ON state angle is 14° degrees or more relative to the non-deflected state.

3. The method of claim 1, further comprising: upon receiving an OFF state signal, adjusting at least one of the applied voltages such that the voltage difference between the mirror plate and addressing electrode is 17 volts or less.

4. The method of claim 3, wherein the second voltage changes 10 volts or more when the minor plate switches between the ON and OFF state.

5. The method of claim 3, wherein the second voltage changes 15 volts or more when the minor plate switches between the ON and OFF state.

6. The method of claim 3, wherein the second voltage changes 20 volts or more when the minor plate switches between the ON and OFF state.

7. The method of claim 3, wherein the change of the second voltage is from 13 to 25 volts when the mirror plate switches between the ON and OFF state.

8. The method of claim 3, wherein the second voltage changes polarity when the minor plate switches between the ON and OFF state.

9. The method of claim 3, wherein the mirror plate is switched between the ON and OFF state with at most one addressing electrode.

10. The method of claim 1, further comprising:

connecting the addressing electrode to a voltage node that is formed by a connection of a drain of a MOS transistor and a first plate of a storage capacitor, wherein the transistor further comprises a source that is connected to a bitline, and a gate that is connected to a wordline; and wherein the storage capacitor further comprises a second plate that is connected to a pumping signal whose voltage varies over time when the mirror plate is switched between the ON and OFF state.

11. The method of claim 10, further comprising: maintaining the second voltage at the addressing electrode for 300 microseconds or more.

12. The method of claim 1, further comprising: maintaining the second voltage at the addressing electrode for 10 microseconds or more.

13. The method of claim 1, further comprising: maintaining the second voltage at the addressing electrode for a time from 100 microseconds to 700 microseconds.

14. The method of claim 1, further comprising maintaining a voltage difference between the first and second voltages at the mirror plate and addressing electrode for 10 microseconds or more.

15. The method of claim 1, further comprising: maintaining a voltage difference between the first and second voltages at the minor plate and addressing electrode for 300 microseconds or more.

16. The method of claim 1, further comprising maintaining a voltage difference between the first and second voltages at the mirror plate and addressing electrode for a time from 100 to 700 microseconds.

17. The method of claim 1, further comprising: placing the addressing electrode at a position such that the distance between the mirror plate and the addressing electrode is from 3 to 9 microns.

18. The method of claim 1, further comprising: placing the addressing electrode at a position such that the distance between the mirror plate and the addressing electrode is from 4 to 7 microns.

19. The method of claim 1, further comprising: placing the addressing electrode at a position such that the distance between the mirror plate and the addressing electrode is around 5.5 microns.

20. A method for operating a micromirror device having a deflectable reflective minor plate that is attached to a deformable hinge held on a substrate, and an addressing electrode that is positioned proximate to the mirror plate, the method comprising:

upon receiving an OFF state signal, applying a first voltage to the mirror plate and a second voltage to the addressing electrode such that the voltage difference between the addressing electrode and minor plate is 17 volts or less under which the minor plate returns to its natural resting state.

21. The method of claim 20, further comprising:

connecting the addressing electrode to a voltage node that is formed by a connection of a drain of a MOS transistor and a first plate of a storage capacitor, wherein the transistor further comprises a source that is connected to a bitline, and a gate that is connected to a wordline; and wherein the storage capacitor further comprises a second plate that is connected to a pumping signal whose voltage varies over time when the minor plate is switched between the ON and OFF state.

22. The method of claim 21, further comprising: maintaining the second voltage at the addressing electrode for 10 microseconds or more.

23. The method of claim 22, further comprising: maintaining the second voltage at the addressing electrode for 300 microseconds or more.

24. The method of claim 21, further comprising: maintaining the second voltage at the addressing electrode for a time from 100 microseconds to 700 microseconds.

25. The method of claim 21, further comprising maintaining a voltage difference between the first and second voltages at the mirror plate and addressing electrode for 10 microseconds or more.

26. The method of claim 25, further comprising maintaining a voltage difference between the first and second voltages at the mirror plate and addressing electrode for 300 microseconds or more.

27. The method of claim 25, further comprising maintaining a voltage difference between the first and second voltages at the mirror plate and addressing electrode for a time from 100 to 700 microseconds.

28. The method of claim 21, further comprising: placing the addressing electrode at a position such that the distance between the mirror plate and the addressing electrode is from 3 to 9 microns.

29. The method of claim 28, further comprising: placing the addressing electrode at a position such that the distance between the mirror plate and the addressing electrode is from 4 to 7 microns.

30. The method of claim 29, further comprising: placing the addressing electrode at a position such that the distance between the mirror plate and the addressing electrode is around 5.5 microns.

31. The method of claim 21, further comprising: upon receiving an ON state signal, applying a first voltage to the mirror plate and a second voltage to the addressing electrode such that the mirror plate is rotated to an ON state angle of 8° degrees or more from a non-deflected state, wherein the difference between said two voltages is 22 volts or less but sufficient enough to move rotate the mirror plate to the ON state.

32. The method of claim 31, wherein the second voltage changes 10 volts or more when the minor plate switches between the ON and OFF state.

33. The method of claim 31, wherein the second voltage changes 15 volts or more when the minor plate switches between the ON and OFF state.

34. The method of claim 31, wherein the second voltage changes 20 volts or more when the minor plate switches between the ON and OFF state.

35. The method of claim 31, wherein the change of the second voltage is from 13 to 25 volts when the mirror plate switches between the ON and OFF state.

36. The method of claim 31, wherein the second voltage changes polarity when the minor plate switches between the ON and OFF state.

37. A spatial light modulator, comprising:

an array of micromirrors, each of which comprises: a substrate; and a deflectable minor plate attached to a deformable hinge that is held on the substrate such that the minor plate is operable to rotate to an ON state and an OFF state; and an array of addressing electrodes for addressing and deflecting the mirror plates, wherein a change of a voltage on the addressing electrode when the minor plate switches between the ON and OFF state is 10 volts or more, wherein each micromirror has only one addressing electrode for deflecting the minor plate of said micromirror.

38. The method of claim 37, wherein change of the voltage is 15 volts or more when the minor plate switches between the ON and OFF state.

39. The method of claim 38, wherein change of the voltage is 20 volts or more when the minor plate switches between the ON and OFF state.

40. The method of claim 38, wherein change of the voltage is from 13 to 20 volts when the minor plate switches between the ON and OFF state.

41. The method of claim 37, wherein the voltage on the addressing electrode changes polarity when the mirror plate switches between the ON and OFF state.

42. The spatial light modulator of claim 37, wherein the mirror plate is positioned at a different plane parallel to the substrate than the hinge when the mirror plate is not deflected.

43. The spatial light modulator of claim 37, wherein the minor plate of the micromirror device has an area of 400 um$^2$ or less.

44. The spatial light modulator of claim 43, wherein the mirror plate of the micromirror device has an area of 225 um$^2$ or less.

45. The spatial light modulator of claim 44, wherein the mirror plate of the micromirror device has an area of 100 um$^2$ or less.

46. The spatial light modulator of claim 37, wherein the mirror plate is operable to rotate to an ON state angle that is 8° degrees or more relative to the substrate.

47. The spatial light modulator of claim 46, wherein the ON state angle is 10° degrees or more.

48. The spatial light modulator of claim 46, wherein the ON state angle is 12° degrees or more.

49. The spatial light modulator of claim 46, wherein the ON state angle is 14° degrees or more.

50. The spatial light modulator of claim 37, wherein the voltage difference between the minor plate and the addressing electrode is from 5.5 volts to 20 volts.

51. The spatial light modulator of claim 50, wherein the voltage difference between the minor plate and the addressing electrode is from 7.5 volts to 18 volts.

52. The spatial light modulator of claim 37, wherein the voltage difference between the mirror plate and the addressing electrode is from 10 volts to 22 volts.

53. The spatial light modulator of claim 37, wherein the mirror plate has a voltage that is 20 volts or more.

54. The spatial light modulator of claim 37, wherein the voltage on the mirror plate is 30 volts or more.

55. The spatial light modulator of claim 37, wherein addressing electrode has a voltage that is 7.5 volts or more.

56. The spatial light modulator of claim 37, wherein the voltage on the addressing electrode is 15 volts or more.

57. The spatial light modulator of claim 37, a voltage difference of 17 volts or more is present between the mirror plate and the addressing electrode when the minor plate is at an OFF state.

58. The spatial light modulator of claim 57, wherein the OFF state corresponds to the mirror plate parallel to the substrate.

59. The spatial light modulator of claim 37, wherein the addressing electrode has an area of generally 75% or more of the area of the mirror plate.

60. The spatial light modulator of claim 37, wherein the addressing electrode has an area of generally 95% or more of the area of the mirror plate.

61. The spatial light modulator of claim 37, wherein the mirror plates are formed on a light transmissive substrate, while the addressing electrodes are formed at a semiconductor substrate.

62. The spatial light modulator of claim 37, wherein the mirror plates and addressing electrodes are formed on a same substrate.

63. The spatial light modulator of claim 37, wherein the voltage difference between the mirror plate and the addressing electrode lasts for 10 microseconds or more.

64. The spatial light modulator of claim 37, wherein the voltage difference between the mirror plate and the addressing electrode lasts for 300 microseconds or more.

65. The spatial light modulator of claim 37, wherein the voltage difference between the mirror plate and the addressing electrode lasts for a time period from 100 to 700 microseconds.

66. The spatial light modulator of claim 37, wherein the addressing electrode at a position such that the distance between the mirror plate and the addressing electrode is from 3 to 9 microns.

67. The spatial light modulator of claim 37, wherein the addressing electrode at a position such that the distance between the mirror plate and the addressing electrode is from 4 to 7 microns.

68. The spatial light modulator of claim 37, wherein the addressing electrode at a position such that the distance between the mirror plate and the addressing electrode is around 5.5 microns.

69. A method of operating a spatial light modulator that comprises an array of micromirror devices, each of which comprises a reflective deflectable mirror plate attached to a deformable hinge; and an addressing electrode for addressing deflecting the mirror plate, the method comprising:

applying a mirror voltage on the mirror plate;

applying a first voltage on the addressing electrode so as to rotate the mirror plate to a first operation state; and applying a second voltage state on the addressing electrode such that the minor plate rotates to a second operation state, where in the second voltage and first voltage have opposite polarities.

70. The method of claim 69, wherein the first operation is an ON state at which the mirror plate has an angle of 12° or more relative to a non-deflected state.

71. The method of claim 70, wherein the angle is 14° or more relative to the non-deflected state.

72. The method of claim 70, wherein the second operation state is an OFF state.

73. The method of claim 72, wherein the voltage difference between the mirror plate and addressing electrode has an absolute value of 17 volts or less.

74. The method of claim 70, wherein the voltage difference between the mirror plate and the addressing electrode when the mirror plate is at the ON state is 30 volts or more.

75. The method of claim 69, wherein the difference between the first and second voltage on the addressing electrode when the mirror plate switches between the first and second operation states has an absolute value of 10 volts or more.

76. The method of claim 75, wherein the absolute value is 15 volts or more.

77. The method of claim 75, wherein the absolute value is from 13 to 25 volts.

78. The meted of claim 69, further comprising:

connecting the addressing electrode to a voltage output node at a connection of a first plate of a capacitor and a drain of a transistor, wherein the transistor comprises a gate connected to wordline signal, and a source connected to bitline signal; and wherein the capacitor comprises a second plate connected to a change-pumping signal whose voltage varies over time during operation.

* * * * *